(12) United States Patent
Seeley (10) Patent No.: US 10,203,054 B2
(45) Date of Patent: Feb. 12, 2019

(54) VACUUM SYSTEM PIPE COUPLINGS

(71) Applicant: Edwards Limited, West Sussex (GB)

(72) Inventor: Andrew James Seeley, West Sussex (GB)

(73) Assignee: Edwards Limited, Crawley (GB)

( * ) Notice: Subject to any disclaimer, the term of this patent is extended or adjusted under 35 U.S.C. 154(b) by 336 days.

(21) Appl. No.: 15/028,298

(22) PCT Filed: Oct. 10, 2014

(86) PCT No.: PCT/GB2014/053054
§ 371 (c)(1),
(2) Date: Apr. 8, 2016

(87) PCT Pub. No.: WO2015/055985
PCT Pub. Date: Apr. 23, 2015

(65) Prior Publication Data
US 2016/0245434 A1    Aug. 25, 2016

(30) Foreign Application Priority Data
Oct. 14, 2013   (GB) .................................. 1318127.6

(51) Int. Cl.
*F16L 17/10*      (2006.01)
*F16J 15/00*      (2006.01)
(Continued)

(52) U.S. Cl.
CPC ............. *F16L 17/10* (2013.01); *F16J 15/002* (2013.01); *F16J 15/14* (2013.01); *F16L 23/10* (2013.01);
(Continued)

(58) Field of Classification Search
CPC . F16L 17/10; F16L 23/18; F16L 23/20; F16L 23/22; F16L 23/10; F16L 23/167; F16L 2201/30
(Continued)

(56) References Cited

U.S. PATENT DOCUMENTS 2,760,673 A * 8/1956 Rudman ............... F16J 15/0881
220/239
3,141,685 A * 7/1964 Watts ..................... F16L 17/063
277/320

(Continued)

FOREIGN PATENT DOCUMENTS

DE    102008012739 A1    9/2009
EP        0144110 A1    6/1985
(Continued)

OTHER PUBLICATIONS

International Preliminary Report on Patentability from International Application No. PCT/GB2014/053054, dated Apr. 19, 2016, 9 pp.
(Continued)

*Primary Examiner* — Aaron M Dunwoody
(74) *Attorney, Agent, or Firm* — Shumaker & Sieffert, P.A.

(57) ABSTRACT

A vacuum system pipe coupling includes a first coupling member and a second coupling member. The vacuum system pipe coupling has a seal system that is to be positioned to seal between the first and second coupling members and a securing system to releasably secure the first coupling member to the second coupling member. The seal system has an inner seal element and an outer seal element spaced from the inner seal element. The first coupling member is provided with a flow passage configured to conduct a pressurized gas to a space between the inner and outer seal elements to shield the outer seal element from fluid flowing (Continued)

through the pipe coupling in the event of failure of the inner seal element.

38 Claims, 6 Drawing Sheets

(51) Int. Cl.

| | | |
|---|---|---|
| *F16J 15/14* | (2006.01) | |
| *F17D 5/02* | (2006.01) | |
| *F16L 23/10* | (2006.01) | |
| *F16L 23/16* | (2006.01) | |
| *F16L 23/22* | (2006.01) | |
| *G01M 3/00* | (2006.01) | |
| *G01M 3/28* | (2006.01) | |
| *F16L 39/00* | (2006.01) | |

(52) U.S. Cl.
CPC ............ *F16L 23/167* (2013.01); *F16L 23/22* (2013.01); *F17D 5/02* (2013.01); *G01M 3/00* (2013.01); *G01M 3/2861* (2013.01); *F16L 39/00* (2013.01); *F16L 2201/30* (2013.01)

(58) Field of Classification Search
USPC .......... 285/96, 106, 337, 365, 367, 366, 917
See application file for complete search history.

(56) References Cited

U.S. PATENT DOCUMENTS

| | | | | |
|---|---|---|---|---|
| 3,531,133 A | * | 9/1970 | Gulick | F16J 15/127 |
| | | | | 277/611 |
| 3,747,963 A | * | 7/1973 | Shivak | F16L 23/20 |
| | | | | 277/614 |
| 4,146,253 A | * | 3/1979 | Celommi | F16L 27/12 |
| | | | | 285/302 |
| 4,178,020 A | * | 12/1979 | Dopyera | F16L 37/002 |
| | | | | 277/607 |
| 4,188,037 A | * | 2/1980 | Abbes | F16J 15/002 |
| | | | | 277/317 |
| 4,325,414 A | * | 4/1982 | Schaefer | E21D 11/385 |
| | | | | 138/109 |
| 4,603,892 A | * | 8/1986 | Abbes | F16J 15/0893 |
| | | | | 277/614 |
| 4,747,606 A | * | 5/1988 | Jennings | F16J 15/0887 |
| | | | | 277/612 |
| 4,815,650 A | * | 3/1989 | Reaux | F16L 55/1608 |
| | | | | 228/119 |
| 4,850,521 A | * | 7/1989 | Servant | F16L 23/20 |
| | | | | 277/614 |
| 5,098,132 A | * | 3/1992 | Burton | F16L 55/1608 |
| | | | | 285/101 |
| 5,118,141 A | * | 6/1992 | Miyashita | F16J 15/0893 |
| | | | | 285/23 |
| 5,133,561 A | * | 7/1992 | Hattori | C23C 16/4409 |
| | | | | 277/646 |
| 5,133,577 A | | 7/1992 | Schultze et al. | |
| 5,538,262 A | | 7/1996 | Matsumura | |
| 5,570,911 A | * | 11/1996 | Galle | F16L 23/04 |
| | | | | 285/24 |
| 5,639,100 A | * | 6/1997 | Garrigues | F16J 15/0893 |
| | | | | 277/614 |
| 5,868,524 A | * | 2/1999 | Martin | E21B 17/085 |
| | | | | 285/97 |
| 6,260,853 B1 | * | 7/2001 | Carr | F16J 15/061 |
| | | | | 277/609 |
| 6,260,854 B1 | * | 7/2001 | Lemon | F16J 15/061 |
| | | | | 277/609 |
| 6,299,216 B1 | * | 10/2001 | Thompson | F16L 23/167 |
| | | | | 277/318 |
| 8,033,579 B2 | * | 10/2011 | Takeda | B25B 27/10 |
| | | | | 285/112 |
| 2004/0046390 A1 | * | 3/2004 | Mosse | F16J 15/061 |
| | | | | 285/363 |
| 2005/0212291 A1 | * | 9/2005 | Edwards | F16L 23/10 |
| | | | | 285/364 |
| 2009/0295155 A1 | * | 12/2009 | Keller-Staub | F16L 23/036 |
| | | | | 285/365 |
| 2010/0230962 A1 | * | 9/2010 | Bongiorno | F16J 15/061 |
| | | | | 285/363 |
| 2012/0074694 A1 | * | 3/2012 | Butte | F16L 23/04 |
| | | | | 285/336 |

FOREIGN PATENT DOCUMENTS

| | | |
|---|---|---|
| EP | 2292953 A1 | 3/2011 |
| GB | 1558857 A | 1/1980 |
| WO | 0120201 A1 | 3/2001 |
| WO | 02059508 A1 | 8/2002 |
| WO | 2012062504 A1 | 5/2012 |

OTHER PUBLICATIONS

International Search Report and Written Opinion dated Dec. 18, 2014 in corresponding International Application No. PCT/GB2014/053054, 13 pgs.
British Search Report and Examination Report under Sections 17 and 18(3) dated May 16, 2014 in GB Application GB1318127.6, 10 pgs.
Office Action from counterpart Japanese Application No. 2016523214, dated Aug. 30, 2018, 6 pp.

\* cited by examiner

FIG 6

VACUUM SYSTEM PIPE COUPLINGS

CROSS-REFERENCE TO RELATED APPLICATION

This application is a Section 371 National Stage Application of International Application No. PCT/GB2014/053054, filed Oct. 10, 2014, which is incorporated by reference in its entirety and published as WO 2015/055985 A1 on Apr. 23, 2015 and which claims priority of British Application No. 1318127.6, filed Oct. 14, 2013.

FIELD OF THE INVENTION

The invention relates to vacuum system pipe couplings.

BACKGROUND

A vacuum system pipe coupling may be used to couple piping in an exhaust system of a vacuum system. The coupling may comprise a first coupling member having a flange, a second coupling member having flange, an O-ring disposed between the flanges to seal between them and a clamp to releasably clamp the flanges together. The clamp applies an axial force to the flanges to compress the O-ring.

Vacuum pumps are frequently deployed in applications that involve pumping substantial quantities of corrosive fluids, including halogen gases and solvents. Such materials attack the O-rings of pipe couplings, with the result that the O-ring may become excessively plastic or very brittle. This can badly affect the integrity of the seal provided.

The intensity of the attack on the O-ring is dependant on a number of variables including, for example, the pumped fluid, the material from which the O-ring is made and the pump temperature. In exhaust systems, a further variable may be the impact of trace heating used to prevent condensation forming in the exhaust piping.

These problems are particularly acute when pumping reactive gases, such as fluorine, from semi-conductor processing equipment, where gas compositions are varied by reactions in the equipment. Here, even a precise knowledge of the gas flows admitted to the process chamber is a very poor predictor of the quantity or nature of the reactive gas admitted to the pump and hence expelled through the exhaust system.

The discussion above is merely provided for general background information and is not intended to be used as an aid in determining the scope of the claimed subject matter. The claimed subject matter is not limited to implementations that solve any or all disadvantages noted in the background.

SUMMARY

In some examples, the disclosure describes a vacuum system pipe coupling that includes a first coupling member, a second coupling member, a seal system to be positioned between the first and second coupling members to seal between the coupling members, and a securing system to releasably secure the first coupling member to the second coupling member. The seal system includes an inner seal element and an outer seal element. The first coupling member is provided with a flow passage configured to conduct a pressurized gas to a space that in use is provided between the inner and outer seal elements to shield the outer seal element from fluid flowing through the pipe coupling in the even of failure of the inner seal element.

In some examples, the disclosure describes a vacuum system that includes a first pipe, a second pipe, and a vacuum system pipe coupling coupling the first pipe to the second pipe. The vacuum system pipe coupling includes a first coupling member connected with the first pipe, a second coupling member connected with the second pipe, a seal system positioned between the first and second coupling members and sealing between the coupling members, and a securing system releasably securing the first coupling member to the second coupling member. The seal system includes an inner seal element and an outer seal element spaced from the inner seal element. The first coupling member is provided with a flow passage configured to conduct a pressurized gas to a space between the inner and outer seal elements to shield the outer seal element from fluid flowing through the pipe coupling in the even of failure of the inner seal element.

In some examples, the disclosure describes a method of protecting a seal system of a vacuum system pipe coupling including a first coupling member releasable secured to a second coupling member by a securing system with the seal system sealing between the first and second coupling members. The sealing system includes an inner seal element and an outer seal element spaced from the inner seal element. The method includes flowing a pressurized gas through a flow passage provided in the first coupling member to a space defined between the inner and outer seal elements to that the pressurized gas can shield the outer seal element from gases flowing through the vacuum system pipe coupling in the event the inner seal element fails.

In some examples, the disclosure describes a vacuum system pipe coupling including a first coupling member, a second coupling member, a seal system to be positioned between the first and second coupling members to seal between the coupling members, and a securing system to releasably secure the first coupling member to the second coupling member. The seal system includes an outer seal including a first material and an inner seal including a second material different to the first material.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

In the disclosure that follows, reference will be made to the drawings in which.

DETAILED DESCRIPTION

Figure 1:
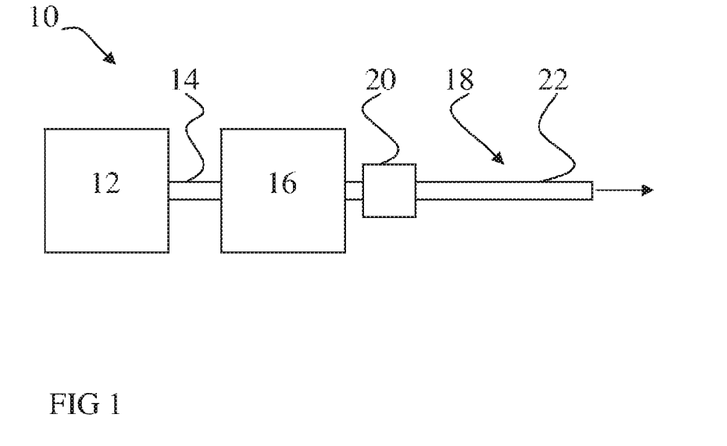
FIG. 1 is a schematic illustration of a vacuum system including a vacuum system pipe coupling.

Referring to FIG. 1, a vacuum system 10 comprises a processing chamber 12, piping 14 connecting the processing chamber with a vacuum pump 16 (the vacuum pump may be directly connected to the processing chamber and the piping omitted), an exhaust system 18 leading from the vacuum pump and comprising a vacuum system pipe coupling 20 connecting the vacuum pump with exhaust piping 22. The exhaust piping 22 may exhaust directly to atmosphere, optionally via filters or traps. Alternatively, the exhaust piping may conduct the exhaust from the vacuum pump to further processing equipment. Filters, traps and the processing of the exhaust from vacuum pumps are all known to those skilled in the art and will not be described further herein.

Figure 2:
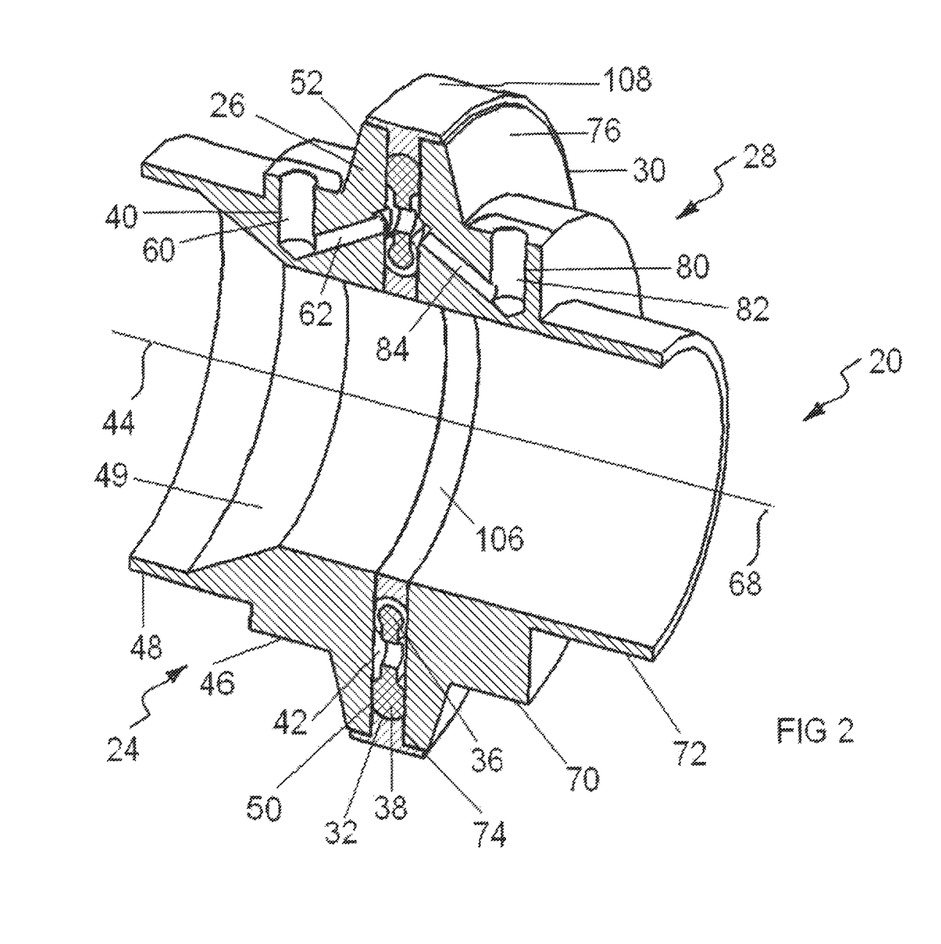
FIG. 2 is a longitudinal section view through the vacuum system pipe coupling of FIG. 1.
Figure 3:
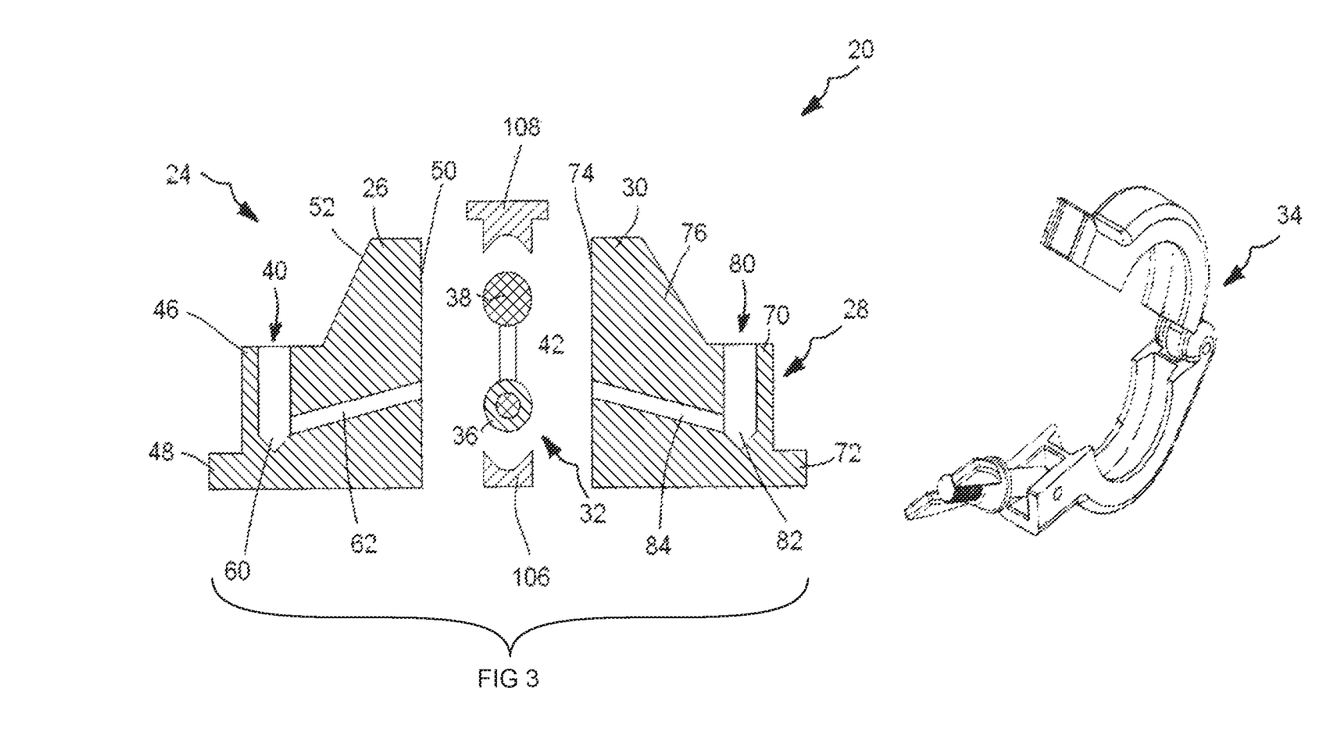
FIG. 3A is a perspective view of a securing system.
FIG. 3B is an exploded view of the upper half of the vacuum system pipe coupling shown in FIG. 2.

Referring to FIGS. 2, 3A and 3B, the vacuum pump system pipe coupling 20 comprises a first coupling member 24 having a first flange 26, a second coupling member 28 having a second flange 30, a seal system 32 disposed between the two flanges to seal between them and a securing system 34 (FIG. 3A) to releasably secure the first flange to the second flange. The seal system 32 comprises an inner seal element 36 and an outer seal element 38 that is spaced form the inner seal element. The first coupling member 24 is provided with a flow passage 40 to conduct a pressurized gas to a space 42 between the inner and outer seal elements 36, 38. The pressurized gas can shield the outer seal element 38 in the event the inner seal element 36 fails.

The first coupling member 24 has a longitudinal axis 44 (FIG. 2) and comprises an annular centre section 46 connected on one side with the first flange 26 and on the opposite side with a pipe stub 48. The first flange 26 comprises a planar sealing face 50 that defines one end of the first coupling member 24 and an inclined clamping face 52 disposed generally opposite the sealing face. The inclined clamping face 52 extends outwardly from the centre section 46 and is inclined towards the sealing face 50 such that in a radially outward direction, the first flange 26 narrows.

The flow passage 40 comprises a first bore 60 that extends perpendicular to the longitudinal axis 44 and a second bore 62 that extends from the first bore to the sealing face 50. The second bore 62 is inclined with respect to the longitudinal axis 44 in the same direction as the clamping face 52, but in the illustrated example is inclined at a different angle. The first bore 60 may be configured to allow connection with standard pneumatic fittings and may, for example, be threaded for connection with an M5 fitting.

The second coupling member 28 has a longitudinal axis 68 (FIG. 2) that is coaxial with the longitudinal axis 44 of the first coupling member 24 such that the axes 44, 68 define a longitudinal axis of the vacuum system pipe coupling 20. The second coupling member comprises a centre section 70 connected on one side with the second flange 30 and on the opposite side with a pipe stub 72. The second flange 30 comprises a planar sealing face 74 that defines one end of the second coupling member 28 and an inclined clamping face 76 disposed generally opposite the sealing face. The inclined clamping face 76 extends outwardly from the centre section 70 and is inclined towards the sealing face 74 such that in the radially outward direction, the second flange 30 narrows. The two clamping faces 52, 76 are inclined in opposite directions so that the portions of the two flanges 26, 30 disposed radially outwardly of the respective centre sections 46, 70 present a generally frusto-conical cross-section.

The second coupling member 28 comprises a flow passage 80 to receive pressurised gas from the space 42. The flow passage 80 comprises a first bore 82 that extends perpendicular to the longitudinal axis 68 and a second bore 84 that extends from the first bore to the sealing face 74. The second bore 84 is inclined with respect to the longitudinal axis 68 in the same direction as the clamping face 76, but in the illustrated example is inclined at a different angle. The first bore 82 may be configured to allow connection with standard pneumatic fittings and may, for example, be threaded for connection with an M5 fitting.

The first and second coupling members 24, 28 may be made of any suitable metal or engineering plastics material and may be metal castings. As best seen in FIG. 2, the first and second coupling members 24, 28 may have different diameter pipe stubs 48, 72. The first coupling member 24 is shown in a configuration in which the flange and pipe stub outside diameters correspond in proportion to those of a standard KF or NW fitting. To accommodate the flow passage 40, the inside diameter of the first flange 26 and centre section 46 is reduced as compared with a standard fitting and there is a tapered transition section 49 between the inner surface of the centre section and the inner surface of the pipe stub 48. The second coupling member 28 accommodates the flow passage 80 by having a second flange 30 and centre section 70 that when compared with the proportions of a standard KF or NW fitting are oversize in relation to the pipe stub 72. For example, the pipe stub 72 may have proportions corresponding to a standard NW40 fitting, while the second flange 30 and centre section 70 have inner diameters proportionate to an NW40 fitting and outer diameters proportionate to an NW50 fitting. It is to be understood that the illustrated configuration is not essential and that the second coupling member 28 may be configured to have proportions corresponding to the first coupling member 24 and vice versa.

Figure 4:
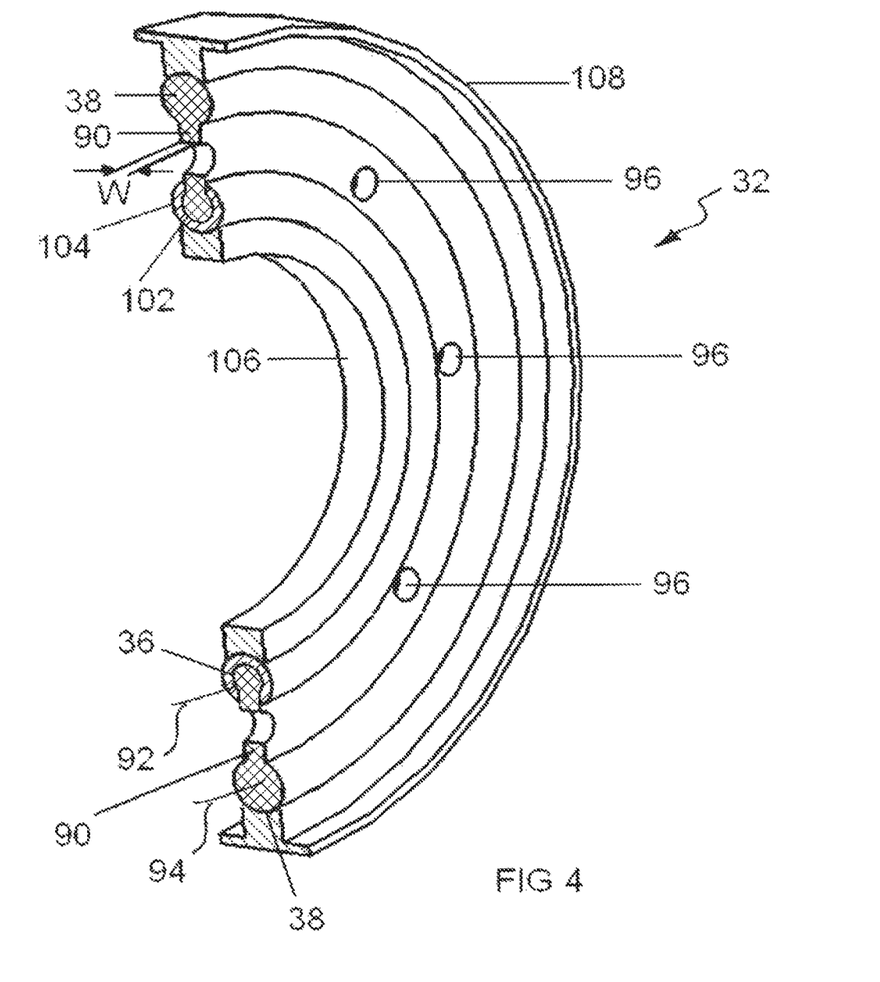
FIG. 4 is a section view of a seal system of the vacuum system pipe coupling.

As best seen in FIG. 4, the inner and outer seal elements 36, 38 are connected by an integral web 90 to form a unitary body. The web 90 acts as a spacer determining the radial positioning of the outer seal element 38 relative to the inner seal element 36. The inner and outer seal elements 36, 38 may each have a circular cross section and may have substantially the same diameter. The web 90 has a width W in a direction parallel to the longitudinal axis of the vacuum system pipe coupling 20 that is less than the diameter (width) of the inner seal element 36 and less than the diameter (width) of the outer seal element 38 so that when the seal elements are disposed between and in engagement the first and second flanges 26, 30, the space 42 is defined between the opposed sealing faces 50, 74 and the inner and outer seal elements 36, 38. In cross-section, the web 90 has a longitudinal axis disposed perpendicular to and coplanar with the respective longitudinal (circumferentially extending) axes 92, 94 of the inner and outer seal elements 36, 38 so that the web is disposed substantially centrally with respect to the seal elements. Accordingly, when the sealing system 32 is installed in the vacuum system pipe coupling 20, the web 90 is disposed generally centrally in the space 42. The web is provided with at least one transverse throughhole 96 to permit pressurised gas supplied from the flow passage 40 to fill the space 42 on either side of the web.

The inner and outer seal elements 36, 38 comprise materials that are different. The outer seal element 38 is made from a first material selected from materials having relatively good mechanical properties, for example resilience and resistance to compression set. The first material may, for example, be a fluoroelastomer such as Viton® made and sold by DuPont. The second material is selected from materials having relatively good resistance to attack by aggressive chemicals that may flow through the vacuum system pipe coupling 20 or relatively good stability at high temperatures. The second material may be a perflouroelastomer such as a grade of Kalrez® made and sold by DuPont or a grade of Perlast® made and sold by Precision Polymer Engineering Ltd. Kalrez® and Perlast® have both been found to provide reliable, long-term service with a wide range of aggressive industrial and electronic grade chemicals of the type that may flow through the vacuum system pipe coupling 20, particularly when used in highly aggressive chemical processing and semiconductor wafer processing applications. Perflouroelastomers also have relatively good high temperature stability. Grades of Kalrez® and Perlast® are rated for maximum continuous service temperatures in excess of 275° C. and up to 327° C.

The materials from which the first and second seal elements are made may have a Shore hardness of 60 to 80, with 70 being a currently preferred value.

In the example illustrated in FIG. 4, the outer seal element 38, web 90 and a core, or substrate, 102 of the inner seal element 36 are made of the same first material and the inner seal element further comprises a sleeve 104 made of the second material. The outer seal element 38, web 90 and core 102 may be made of a selected grade of Viton® or another material selected for having relatively better resilience or resistance to compression set than the sleeve 104. The sleeve 104 may be made of a selected grade of Kalrez® or Perlast® or another material selected for having relatively better resistance to chemical erosion or high temperature stability than the material from which the outer seal element 38, web 90 and core 102 are formed. Since polymers such as Kalrez® and Perlast® are very expensive, having a core made of a relatively cheap material, such as Viton®, sleeved with the more expensive material reduces the cost of the seal system 32. The sealing elements 36, 38 and web 90 may be made by a co-moulding process.

The seal system 32 further comprises an inner seal carrier 106 and an outer seal carrier 108. The inner seal carrier 106 is an annular body made of a suitable metal, or engineering plastics material, and is disposed radially inwardly of the inner seal element 36. The inner seal carrier 106 has a generally rectangular cross-section with a slightly concave face facing the inner seal element 36 in order to facilitate mating of the two parts. The outer seal carrier 108 is an annular body made of a suitable metal or engineering plastics material. The outer seal carrier 108 has a generally T-shaped section, or profile, defined by an inner body portion having a cross-section similar to, or the same as, the inner seal carrier 106 and a wider plate-like outer portion disposed at the end of the body portion opposite the end provided with the concave face. The outer seal carrier 108 provides support for the outer seal element 38 and centres the coupling members 24, 28. In other examples, the outer seal carrier may be shaped generally as the inner seal carrier shown in FIGS. 2 and 3B and the inner seal carrier shaped generally as the outer seal carrier shown in those drawings so that it is the inner seal carrier that centres the coupling members 24, 28.

Referring to FIG. 3A, the securing system 34 comprises a clamp that is used to releasably secure the first and second coupling members 24, 28 to one another by engaging the clamping faces 52, 76 and pressing the coupling members towards one another. The clamp may take any suitable form and may, for example, be one such as those known in the art for clamping KF or NW fittings. Since such clamps will be known to those skilled in the art, they will not be described in detail herein.

Figure 5:
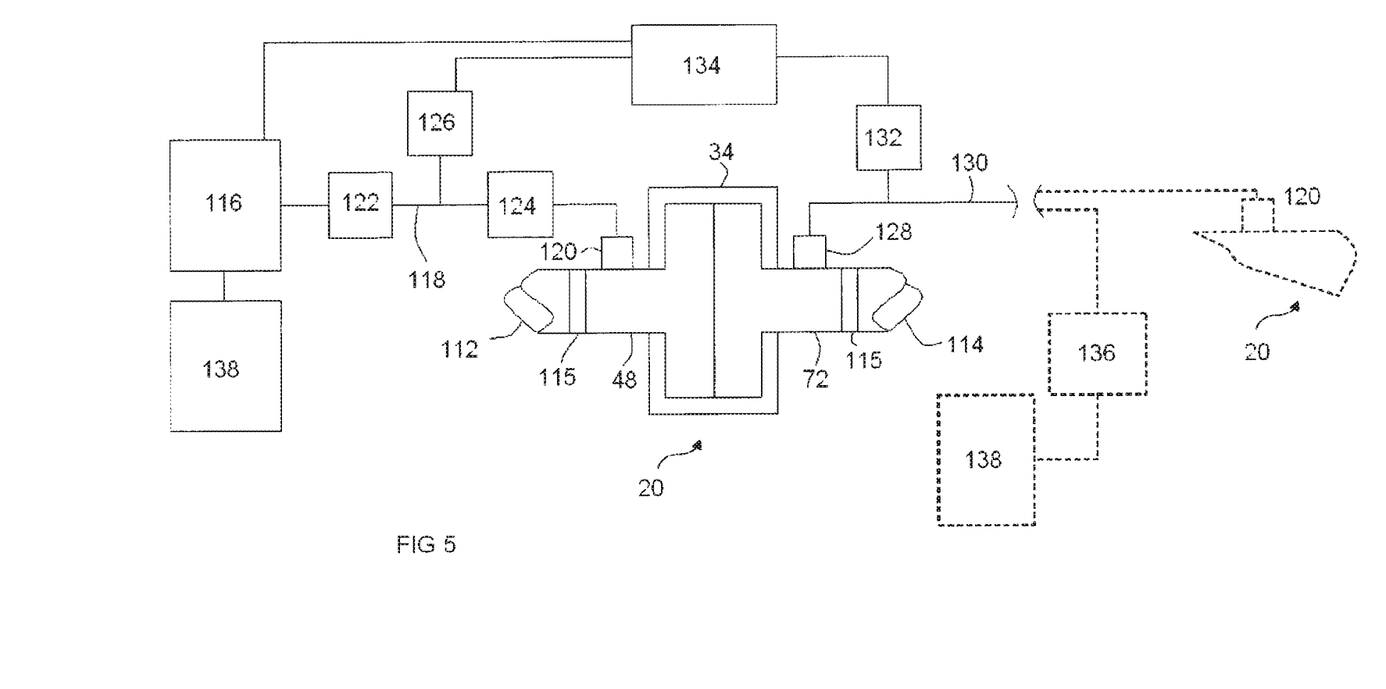
FIG. 5 is a schematic illustration of a pipe system comprising the vacuum system pipe coupling of FIGS. 2 to 4.

As shown in FIG. 5, in use the vacuum pipe system coupling 20 may be fitted into piping, such as the piping of the exhaust system 18 shown in FIG. 1, by connecting the pipe stubs 48, 72 to respective lengths of piping. The pipe stub 48 may be connected to a length of piping 112 and the pipe stub 72 connected to a length of piping 114. The respective connections between the pipe stubs 48, 72 and the piping 112, 114 may be made by any known method that is convenient, for example by circumferential welds 115 formed using an orbital welding process. The seal system 32 is disposed between the sealing faces 50, 74 of the first and second coupling members 24, 28, which are secured to one another by the securing system 34. The securing system 34 acts on the clamping surfaces 52, 76 to press the first and second coupling members 24, 28 together so that the inner and outer seal elements 36, 38 are compressed between the sealing faces 50, 74 to seal the connection. As shown in FIG. 2, the compression of the inner and outer seal elements 36, 38 results in a flattening of the sides of the seal elements against the sealing faces 50, 74.

The first flow passage 40 is connected with a gas module 116 via piping 118 and a pneumatic fitting 120 provided on an end of the piping and fitted into the upstream end of the first bore 60. Pressurised gas is supplied from the gas module 116 to the first flow passage 40 which conducts the pressurised gas to the space 42 defined between the sealing faces 50, 74 and the inner and outer seal elements 36, 38. A one-way valve 122 and a flow restrictor 124 are connected with the piping 118 upstream of the first flow passage 40. A first transducer 126 is connected with the piping 118 so as to be able to sense, or detect, the pressure of the pressurised gas in the piping upstream of the flow restrictor 124. The one-way valve 122 prevents contamination of gas at the gas module 116 by backflow that may occur in the event the pressure in the space 42 rises above the pressure at which the pressurised gas is supplied by the gas module 116. The flow restrictor 124 may be made from a slightly porous material that inhibits the flow of gas such that it acts like a dam, allowing a trickle of gas to pass through. Alternatively, the flow restrictor 124 may be a fine metering valve or a fine capillary hole provided in a solid material.

The downstream end of the second flow passage 80 is connected with a pneumatic fitting 128 provided on an end of piping 130. The piping 130 receives pressurised gas that has passed from the first flow passage 40 through the space 42 and into the second flow passage 80 to conduct the gas away from the vacuum system pipe coupling 20. The piping 130 may return the pressurised gas via suitable filters, traps or other suitable equipment 136 for resupply by the gas module 116 or conduct it to the first flow passage 40 of another vacuum system pipe coupling 20. A second transducer 132 is connected with the piping 130 to sense the pressure of the pressurised gas that has exited the second flow passage 80. The first and second transducers 126, 132 are connected with a controller, or determining unit, 134 to pass signals indicative of the sensed pressures P1 (transducer 126) and P2 (transducer 132) to the controller.

The supply of pressurised gas is controlled by the gas module 116. The gas module 116 may comprise an active manifold that regulates a supply of gas from a reservoir 138. The gas module 116 is set to supply pressurised gas into the piping 118 at a pressure above that of the exhaust gases flowing through the vacuum system pipe coupling 20. The supply pressure may be 2 Bar (approximately 200 KN/m$^2$). The gas module 116 is configured to send signals to the controller 134 indicating the characteristics of the gas supplied into the piping 118, for example the flow rate and gas pressure. In addition to supplying the pressurised gas to the vacuum system pipe coupling 20, the gas module 116 may be used to distribute a purge gas to different locations within a vacuum system of which the pipe coupling is apart.

In use, pressurised gas from the gas module 116 is supplied to the space 42 via the piping 118 and first flow passage 40. The pressurised gas serves to inflate the sealing system 32 and passes from the space 42 to the second flow passage 80 and on into the piping 130. In normal conditions in which the inner and outer seal elements 36, 38 are intact, the pressures sensed by the pressure transducers 126, 132 should be steady and even and the signals received by the controller 134 should indicate a consistent, or steady state, difference between the two pressures. If either of the inner and outer seal elements fails, the pressure downstream of the flow restrictor 124 should fall and there will be noticeable change in the pressure difference indicated by the signals the controller 134 receives from the pressure transducers 126, 132. The controller 134 is configured to compare the signals received from the first and second transducers 126, 132 to determine the condition of the seal system 32. In the event the comparison shows a change in the relative pressures, the controller 134 may determine that one of the seal elements has failed and output a signal to cause an indicator to provide an indication the seal system 32 has failed. The indicator may provide a visual indication, for example a flashing light or another visible warning such as a message on a screen or the like, or an audible alarm, to indicate that the seal system has failed. The signal from the controller 134 may be sent to a computerised control system for the vacuum system of which the vacuum system pipe coupling 20 rather than to a dedicated indicator associated with the controller and in some examples, the controller may be integrated into such a computerised control system.

In the event of a failure of one of the seal elements 36, 38 of the seal system 32, the other seal element should continue to function so that the integrity of the vacuum coupling system 20 is not immediately compromised. This allows time for a repair to be organised and scheduled into the operation of the vacuum system.

The pressurised gas supplied by the gas module 116 may be an inert gas such as nitrogen or oxygen free nitrogen. Accordingly, if the outer seal element 38 fails, all that is released to atmosphere is an inert gas, while if the inner seal element 36 fails, the gas entering the flowpath through the vacuum system pipe coupling 20 will not trigger a reaction with the exhaust gases flowing through the coupling. This can be important if the gases flowing through the coupling are liable to spontaneously combust.

If the inner seal element 36 failed in the absence of the pressurised gas in the space 42, the outer seal element 38 would potentially be exposed to the exhaust gases flowing through the vacuum system pipe coupling 20. In many operating environments, this would expose the outer seal element 38 to chemical damage it is less well equipped to withstand than the inner seal element. However, the pressurised gas supplied into the space 42 via the first flow path 40 may act as a shield for the outer seal element 38, protecting it from the exhaust gases flowing through the vacuum system pipe coupling 20 and thereby prolonging the period in which the vacuum system pipe coupling 20 can continue in use prior to being disassembled to allow replacement of the seal system 32.

Figure 6:
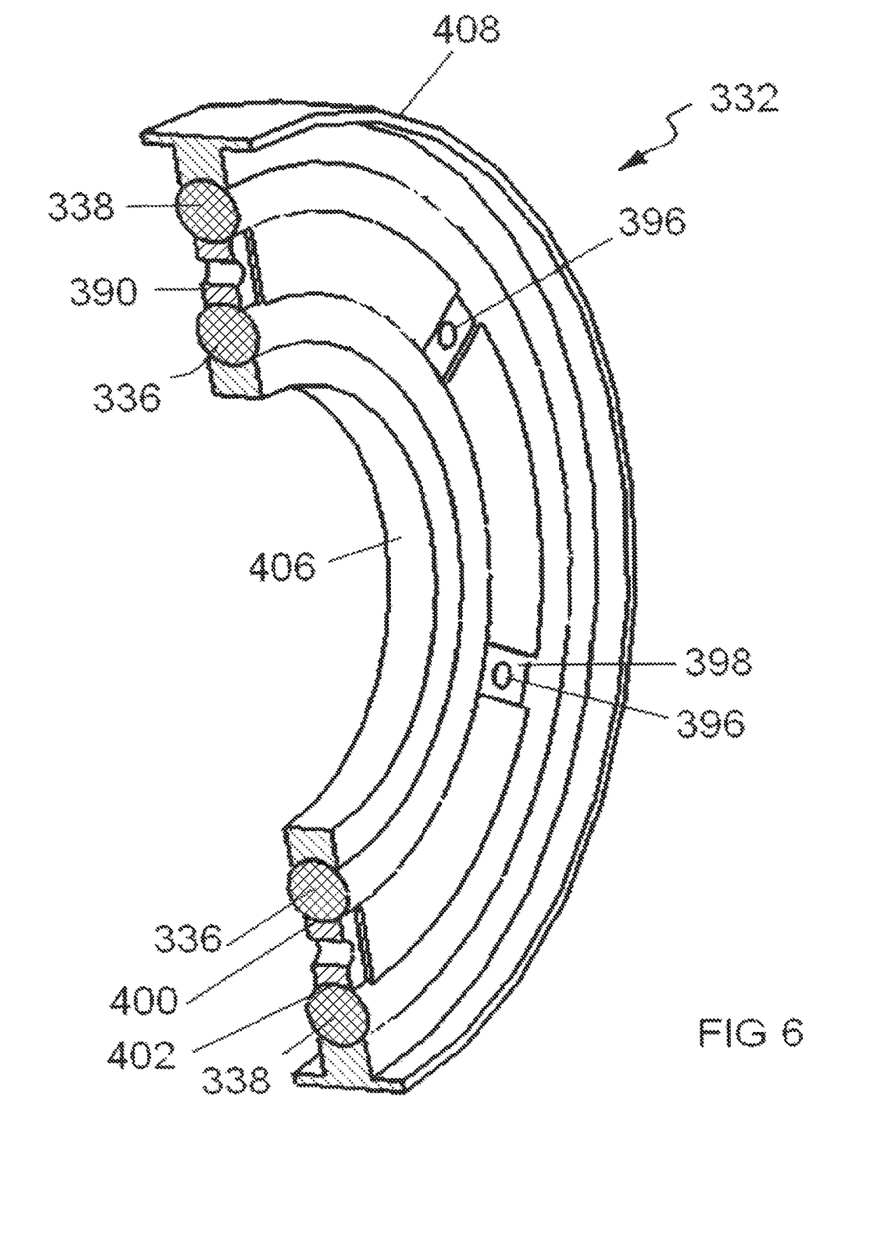
FIG. 6 is a section view of another seal system of a vacuum system pipe coupling.

FIG. 6 shows a sealing system 332 that may be used in the vacuum system pipe coupling 20 in place of the sealing system 32. The sealing system 332 comprises an inner seal element 336, an outer seal element 338 and a spacer 390.

The inner seal element 336 is an O-ring made of a material having relatively good resistance to chemical attack and good high temperature stability. The inner seal element 336 may, for example, be made from a perflouroelastomer such as Kalrez® or Perlast®. The inner seal element 336 may comprise a core, or substrate, made of a relatively cheaper material, such as Viton® coated, sleeved or otherwise suitably covered with a relatively expensive outer layer made of Kalrez, Perlast or the like. The outer seal element 338 is an O-ring made of a material having relatively good mechanical properties such as resilience and resistance to compression set and may, for example, be a fluoroelastomer such as Viton®.

In the sealing system 332, the inner and outer seal elements 336, 338 are separate bodies and instead of being connected by an integral web as in the sealing system 32, they are separated, or spaced apart, by a separate spacer 390. The spacer 390 is an annular body having a rectangular cross-section and may be made of any suitable metal, for example aluminum or stainless steel, or an engineering plastics material. The respective opposed faces 400, 402 of the spacer 390 that contact the inner and outer seal elements 336, 338 are slightly concave to facilitate mating with the seal elements and centre the spacer with respect to the seal elements.

The spacer 390 has a width W in a direction parallel to the longitudinal axis of the vacuum system pipe coupling 20 that is less than the diameter (width) of the inner seal element 336 and less than the diameter (width) of the outer seal element 338 an that when the seal elements are disposed between and in engagement with the first and second flanges 26, 30, the space 42 is defined between the opposed sealing faces 50, 74 and the inner and outer seal elements 336, 338. In cross-section, the spacer 390 has a longitudinal axis disposed perpendicular to the respective longitudinal (circumferentially extending) axes 392, 394 of the inner and outer seal elements 336, 338 so that the web is disposed substantially centrally with respect to the seal elements and consequently with respect to the sealing faces 50, 74 so as to lie centrally in the space 42.

The spacer 390 is provided with a plurality of transverse through-holes 396 to permit pressurised gas supplied from the flow passage 40 to fill the space 42 on either side of the spacer. At least on one side of the spacer 390, a depression 398 is provided around each through-hole 396.

The sealing system 332 further comprises an inner seal carrier 406 and an outer seal carrier 408. These components may be the same as the inner and outer seal carriers 106, 108 shown in FIGS. 2 to 4 and so will not be described in detail again.

In the illustrated examples, the securing system comprises a clamp used to releasably clamp the first and second couplings to one another. It is currently envisaged that the securing system will comprise a quick-release clamp the same as, or operating on similar principles to known quick release clamps used for securing components of KF and NW fittings known in the art. It is to be understood that the invention is not limited to this and in principle, the securing system may comprise any apparatus or arrangement of components suitable for releasably securing the first and second coupling members to one another, including, but not limited to, a plurality of bolts, screws or studs engaging nuts or threaded apertures provided in one of the coupling members.

In the illustrated examples, a separate spacer or integral web is provided to determine the spacing between the inner and outer seal elements. In another example, the spacer may be integral with one of the inner and outer seal elements and separate of the other.

In the example illustrated by FIG. 5, the piping 130 is shown optionally connected to the first flow passage in the first coupling member of a second vacuum system pipe coupling 20. Connecting the pressurised gas supply to the flow passages of a series of vacuum system couplings in this way allows one gas supply to be used for seal system monitoring in two or more vacuum system pipe couplings.

In some examples the vacuum system pipe coupling may be marketed as a kit, for example to be fitted in existing installations. In other examples, the vacuum system pipe coupling may be marketed as a part of a vacuum system with the first and second coupling members ready fitted to piping of the vacuum system.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A vacuum system pipe coupling comprising:
   a first coupling member comprising a first flow passage;
   a second coupling member comprising a second flow passage;
   a seal system to be positioned between the first and second coupling members to seal between the first and second coupling members; and
   a securing system to releasably secure the first coupling member to the second coupling member,
   wherein the seal system comprises an inner seal element, an outer seal element, and a spacer received in a space between the inner seal element and the outer seal element, wherein the spacer separates the inner and outer seal elements, wherein the first flow passage of the first coupling member is configured to conduct a pressurized gas to the space between the inner and outer seal elements to shield the outer seal element from fluid flowing through the pipe coupling in the event of failure of the inner seal element, and wherein the spacer comprises at least one through-hole configured to permit the pressurized gas from the first flow passage of the first coupling member to flow to the second flow passage of the second coupling member.

2. The vacuum system pipe coupling as claimed in claim 1, wherein the spacer is integral with at least one of the inner and outer seal elements.

3. The vacuum system pipe coupling as claimed in claim 1, wherein the inner seal element has a first width, the outer seal element has a second width and the spacer comprises at least one portion having a third width less than the first and second widths of the inner and outer seal elements.

4. The vacuum system pipe coupling as claimed in claim 1, further comprising:
   a first pipe to be connected to an inlet end of the flow passage of the first coupling member;
   a flow restrictor;
   a first transducer to be connected with the first pipe so that the first transducer can provide signals indicative of the pressure of the pressurized gas flowing in the first pipe pressure upstream of the flow restrictor;
   a second pipe to be connected with an outlet end of the flow passage of the second coupling member;
   a second transducer to be connected with the second pipe to provide signals indicative of the pressure of the pressurized gas flowing in the second pipe; and
   a determining unit that receives the signals from the first and second transducers and determines seal system condition based on a comparison of the signals.

5. The vacuum system pipe coupling as claimed in claim 1, wherein the outer seal element comprises a first material and the inner seal element comprises a second material that is different from the first material.

6. The vacuum system pipe coupling as claimed in claim 5, wherein the first material has greater resistance to compression set than the second material.

7. The vacuum system pipe coupling as claimed in claim 1, wherein the first coupling member comprises a first flange having a first sealing surface, the second coupling member comprises a second flange having a second sealing surface and in use the sealing system is disposed between and in engagement with the first and second sealing surfaces, the space being defined between the first and second sealing surfaces and the inner and outer seal elements.

8. A vacuum system comprising:
   a first pipe;
   a second pipe; and
   a vacuum system pipe coupling the first pipe to the second pipe, wherein the vacuum system pipe coupling comprises:
   a first coupling member connected with the first pipe, wherein the first coupling member comprises a first flow passage;
   a second coupling member connected with the second pipe, wherein the second coupling member comprises a second flow passage;
   a seal system positioned between the first and second coupling members and sealing between the first and second coupling members; and
   a securing system releasably securing the first coupling member to the second coupling member,
   wherein the seal system comprises an inner seal element, an outer seal, and a spacer received in a space between the inner seal element and the outer seal element, wherein the spacer separates the inner and outer seal elements, wherein the flow passage is configured to conduct a pressurized gas to the space between the inner and outer seal elements to shield the outer seal element from fluid flowing through the pipe coupling in the event of failure of the inner seal element, and wherein the spacer comprises at least one through-hole configured to permit the pressurized gas from the first flow passage of the first coupling member to flow to the second flow passage of the second coupling member.

9. The vacuum system pipe coupling as claimed in claim 8, wherein said spacer is integral with at least one of said inner and outer seal elements.

10. The vacuum system as claimed in claim 8, wherein the inner seal element has a first width, the outer seal element has a second width and the spacer comprises at least one portion having a third width less than the first and second widths of the inner and outer seal elements.

11. The vacuum system as claimed in claim 8, further comprising:
   a pressurized gas supply connected with the flow passage of the first coupling member by first piping;
   a flow restrictor connected with the first piping;
   a first transducer to provide signals indicative of pressurized gas pressure in the first piping upstream of the flow restrictor;
   second piping connected with the flow passage of the second coupling member to conduct the pressurized gas away from the vacuum system pipe coupling;

a second transducer connected with the second piping to provide signals indicative of pressurized gas pressure in the second piping; and a determining unit that receives the signals from the first and second transducers and judges seal system condition based on a comparison of signals received from the first and second transducers.

12. The vacuum system as claimed in claim 8, wherein the outer seal element comprises a first material and the inner seal element comprises a second material that is different the first material.

13. The vacuum system as claimed in claim 12, wherein the first material has greater resistance to compression set than the second material.

14. The vacuum system as claimed in claim 12, wherein the second material has at least one of:
   i) greater high temperature stability than the first material; and
   ii) greater resistance to chemical corrosion than the first material.

15. The vacuum system as claimed in claim 12, wherein the first material is a fluoroelastomer.

16. The vacuum system as claimed in claim 12, wherein the second material is a perflouroelastomer.

17. The vacuum system as claimed in claim 12, wherein the inner seal element comprises a substrate and the second material is carried on the substrate.

18. The vacuum system as claimed in claim 12, wherein at least one of the first and second materials has a Shore hardness of 60 to 80.

19. The vacuum system as claimed in claim 8, wherein the first and second pipes receive exhaust gases from a vacuum pump.

20. A method of protecting a seal system of a vacuum system pipe coupling, the method comprising:
   positioning a seal system between first coupling member and a second coupling member to seal between the first and second coupling members, wherein the first coupling member comprises a first flow passage and the second coupling member comprises a second flow passage;
   releasably securing the first coupling member to the second coupling member using a securing system, wherein the seal system comprises an inner seal element, and outer seal element, and a spacer received in a space between the inner seal element and the outer seal element, wherein the spacer separates the inner and outer seal elements, wherein the first flow passage of the first coupling member is configured to conduct a pressurized gas to the space between the inner and outer seal elements to shield the outer seal element from fluid flowing through the pipe coupling in the event of failure of the inner seal element, wherein the spacer comprises at least one through-hole configured to permit the pressurized gas from the first flow passage of the first coupling member to flow to the second flow passage of the second coupling member; and
   flowing the pressurized gas through the first flow passage in the first coupling member to the space defined between the inner and outer seal elements so that the pressurized gas shields the outer seal element from gases flowing through the vacuum system pipe coupling in the event the inner seal element fails.

21. The method as claimed in claim 20, wherein the pressurized gas is an inert gas.

22. The method as claimed in claim 20, wherein the gases flowing through the vacuum system pipe coupling are exhaust gases from a vacuum pump.

23. The method as claimed in claim 20, wherein the gases flowing through the vacuum system pipe coupling are at a first pressure and the pressurized gas is at a second pressure greater than the first pressure.

24. The method as claimed in claim 23, wherein both the pressures are above atmospheric pressure.

25. A vacuum system pipe coupling comprising:
   a first coupling member;
   a second coupling member;
   a seal system to be positioned between the first and second coupling members to seal between the first and second coupling members; and
   a securing system to releasably secure the first coupling member to the second coupling member,
   wherein the seal system comprises an outer seal element comprising a first material and an inner seal element comprising a second material different from the first material, and wherein the inner seal element comprises a substrate and the second material is carried on the substrate.

26. The vacuum system pipe coupling as claimed in claim 25, wherein the second material has at least one of:
   i) greater high temperature stability than the first material; and
   ii) greater resistance to chemical corrosion than the first material.

27. The vacuum system pipe coupling as claimed in claim 25, wherein the first material is a fluoroelastomer.

28. The vacuum system pipe coupling as claimed in claim 25, wherein the second material is a perflouroelastomer.

29. The vacuum system pipe coupling as claimed in 25, wherein the inner seal element comprises a substrate and the second material is carried on the substrate.

30. The vacuum system pipe coupling as claimed in claim 25, wherein at least one of the first and second materials has a Shore hardness of 60 to 80.

31. The vacuum system pipe coupling as claimed in claim 25, wherein the inner and outer seal elements are separated by a spacer that is configured to be received in the space.

32. The vacuum system pipe coupling as claimed in claim 31, wherein the spacer is integral with at least one of the inner and outer seal elements.

33. The vacuum system pipe coupling as claimed in claim 31, wherein the inner seal element has a first width, the outer seal element has a second width and the spacer comprises at least one portion having a third width less than the first and second widths of the inner and outer seal elements.

34. The vacuum system pipe coupling as claimed in claim 25, wherein the first material has greater resistance to compression set than the second material.

35. The vacuum system pipe coupling as claimed in claim 25, wherein the second material has at least one of:
   i) greater high temperature stability than the first material; and
   ii) greater resistance to chemical corrosion than the first material.

36. The vacuum system pipe coupling as claimed in claim 25, wherein the first material is a fluoroelastomer.

37. The vacuum system coupling as claimed in claim 25, wherein the second material is a perflouroelastomer.

38. The vacuum system pipe coupling as claimed in claim 25, wherein at least one of the first and second materials has a Shore hardness of 60 to 80.

* * * * *